March 1, 1960   L. E. HENYON ET AL   2,926,540
SHIFTER MECHANISM FOR POWER SHIFTED TRANSMISSIONS
Filed Dec. 24, 1957   3 Sheets-Sheet 1

INVENTORS.
LEWIS E. HENYON
WILLIAM F. LEONARD
BY
ATTYS.

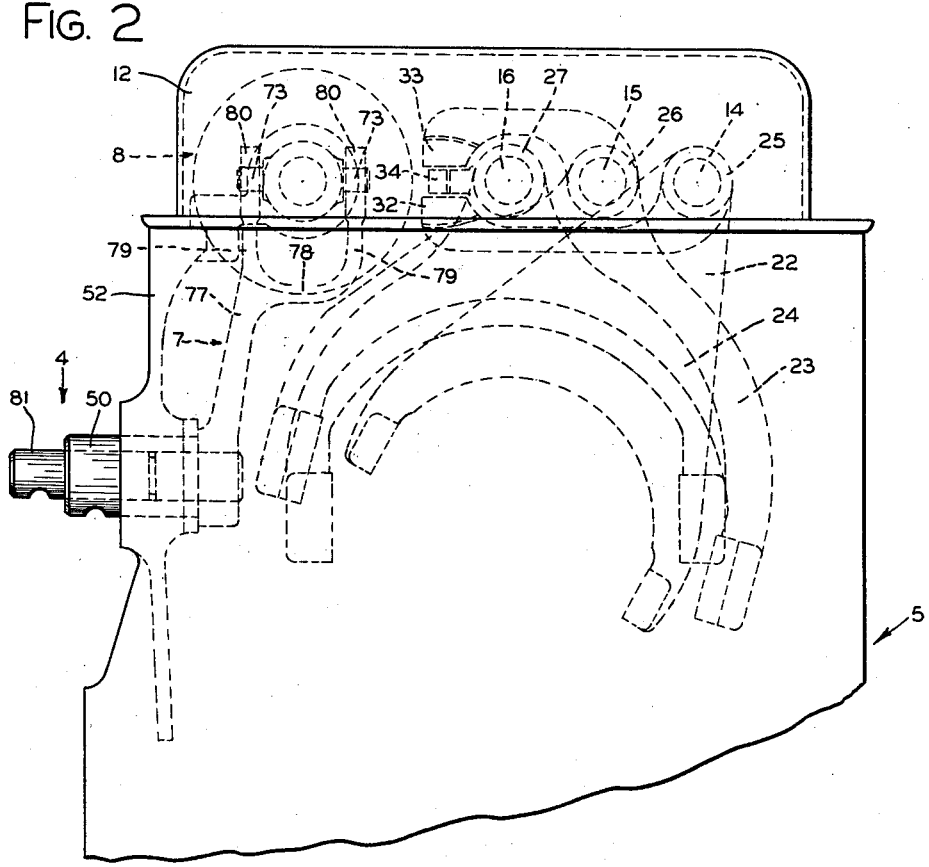
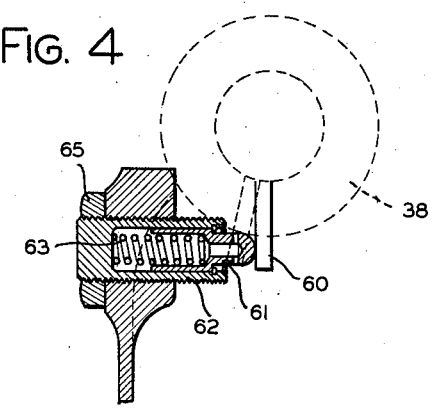

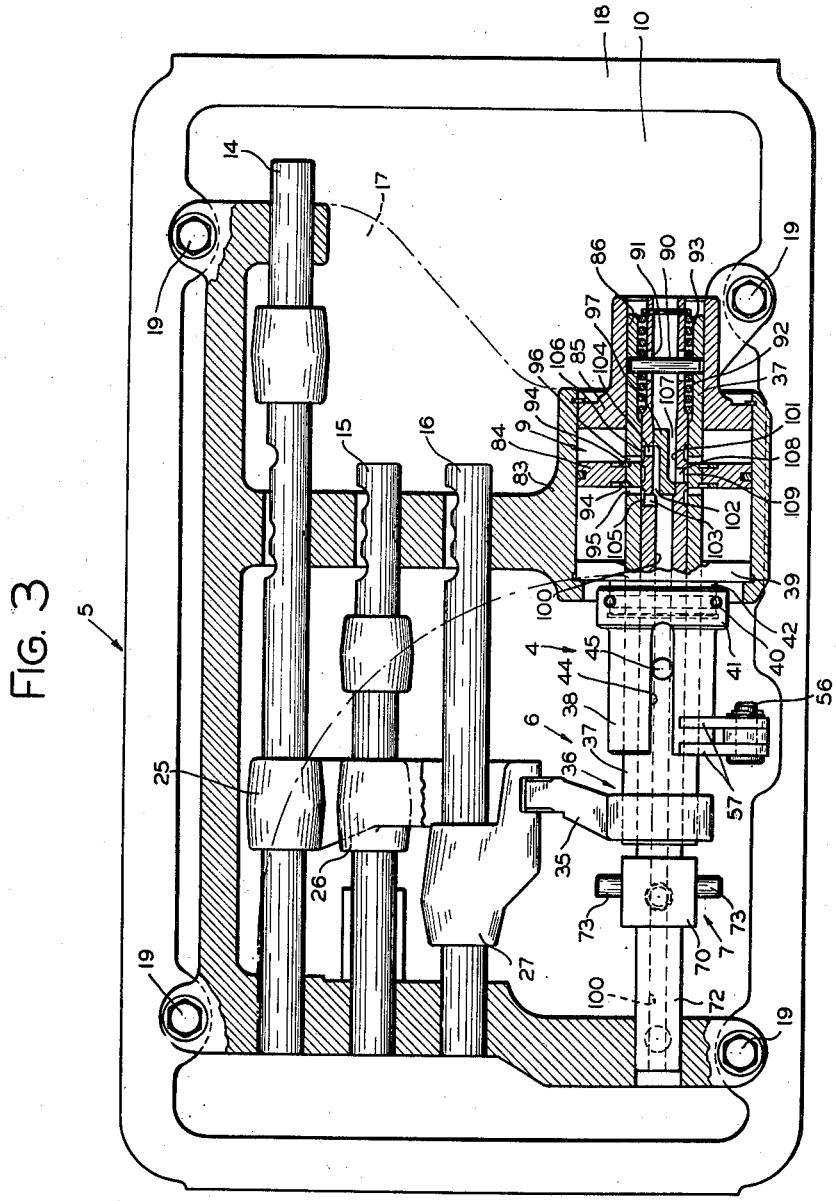

United States Patent Office 2,926,540
Patented Mar. 1, 1960

2,926,540

SHIFTER MECHANISM FOR POWER SHIFTED TRANSMISSIONS

Lewis E. Henyon and William F. Leonard, Jackson, Mich., assignors to Clark Equipment Company, a corporation of Michigan Application December 24, 1957, Serial No. 705,012

9 Claims. (Cl. 74—364)

Our invention relates to shifter mechanisms for use, for example, with a multi-shift transmission for a self-propelled vehicle, and more particularly, to provide for selectively controlling a motor means or power shifting device for effecting or assisting the making of desired shifting operations in the transmission in accordance with the selected manual manipulation of the shifter mechanism.

In heavy duty self-propelled machines, such as, for example, highway trucks and tractors, it is desirable for the operator or the driver to have the machine under his selective manual control, but to afford efficiency in effecting change in direction of drive or drive ratio through the transmission it is desirable that a power source in the form of suitable motor means be used for assisting or effecting appropriate actuation of the transmission. Such motor means is especially desirable on remote control applications; that is in instances in which the transmission is located remotely from the cab or operator's station so that it is necessary to employ intervening linkage, Bowden wires or the like to operate the motor means.

Our present invention is concerned with the aforementioned problem and, accordingly, it is an object of our invention to provide improved manually operable shifter mechanism, the actuation of which affords the application of power of motor means or power shifting device to shift shiftable members such as the shift rails of a multi-shift transmission.

A further object of our invention is to provide a shifter mechanism of simple design and which may be readily incorporated with a multi-shift transmission to provide a compact arrangement for efficient assembly in a self-propelled vehicle.

As aforementioned, the shifter mechanism of our invention is adapted to be associated with a multi-shift transmission and motor means in which the transmission may be conventional construction and operation, and in which the motor means preferably is of a character comprising a power piston and power cylinder assembly and control valve means including a movable force applying member having valve seat means and, valve rod, with valve rod and the power piston being disposed and movable relative to each other on a common axis. In such arrangement, the valve rod is movable to control the selective admission of fluid under pressure to the power cylinder opposite either or both ends of the power piston to retain the latter against movement or to move it in one direction or the other in the power cylinder. The valve rod is thus movable to afford desired energization of the power piston and cylinder assembly, and movement of the power piston affords a source of power to effect or assist making a shift in the transmission.

It is a further object of our invention to provide shifter mechanism in an arrangement of parts as last described in which gear selector means is provided for the operator to select manually a desired direction or ratio of drive through the transmission, and manually operable motor energizing means for controlling movement of the valve rod of the motor means or power shifting device to afford the application of power of the latter to effect or assist in the selected shifting operation.

A further object is to provide shifter mechanism as last mentioned, in which the gear selector means and the motor energizing means include parts disposed coaxially of the common axis of the power piston and power cylinder assembly and control valve means for axial and rotating movement about such axis.

A further object is to provide shifter mechanism as last described, in which the gear selector means and motor energizing means include shaft members lying on a common axis transverse to the axis of the power and cylinder assembly.

A further object is to provide an arrangement as noted, in which the shaft members last mentioned are journaled one within the other.

A further object is to provide shifter mechanism which may be readily and conveniently disposed within the cover of a transmission housing without materially adding to the size or cost of the latter.

A still further object is to provide in association with a transmission having a plurality of parallel shifter rails, shifter mechanism and motor means arranged with components thereof in parallel relation with the shifter rails to provide a compact and readily serviceable assembly.

A still further object is to provide biasing means in the form of spring means which is adapted to be loaded to afford an indication to the operator that he is conditioning the transmission and motor means for a particular shifting operation, such as disposition of the gear selector means in position relative to the transmission to afford a first drive forward ratio or reverse drive through the transmission.

The above and other objects and advantages of our invention will appear from the detail description.

Now, in order to acquaint those skilled in the art with the manner of constructing and utilizing a shifter mechanism in accordance with our present invention, we shall describe in connection with the accompanying drawings a preferred embodiment of our invention.

In the drawings:

Figure 2 is an end view of the construction shown in Figure 1;

Figure 3 is a plan view of the construction shown in Figure 2 but with the cover of the transmission removed; and Figure 4 is a detail vertical sectional view taken along line 4—4 Figure 1, looking in the direction indicated by the arrows.

Figure 1:
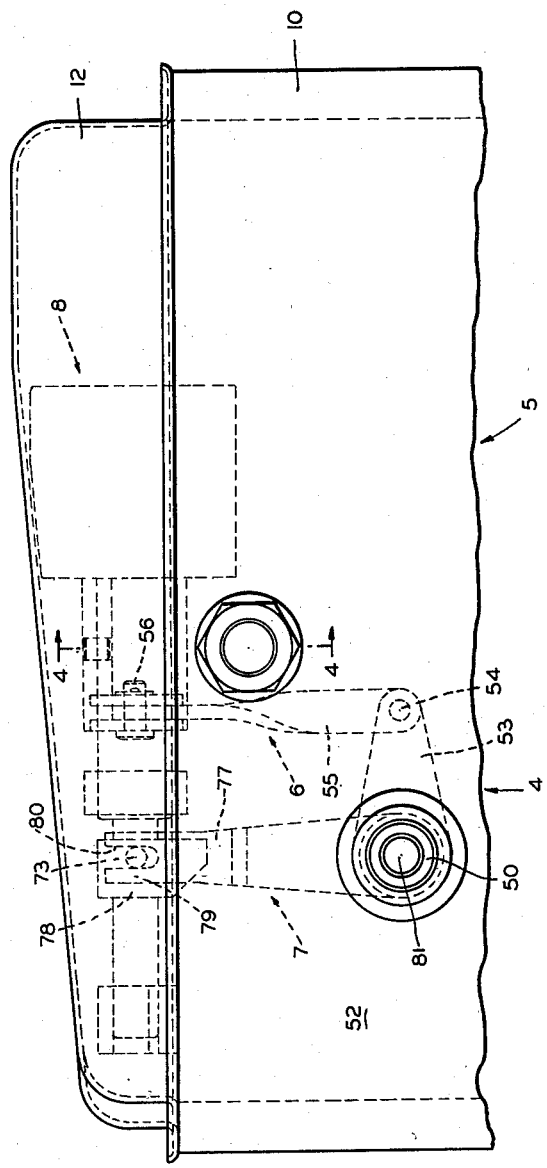
Figure 1 is a side elevational view of a portion of a transmission and showing a shifter mechanism of our invention assembled therewith.

Referring now to the drawing, the shifter mechanism 4 of our invention is shown in association with a transmission indicated generally at 5 which may be largely of conventional construction. The shifter mechanism 4 as shown includes gear selector means indicated generally at 6, and motor energizing means, indicated generally at 7, for controlling energization of motor means shown at 8, which in the specific embodiment of my invention herein disclosed comprises a power piston and cylinder assembly 9, which per se forms the subject matter of our copending application, Serial No. 704,935 filed December 24, 1957, to which reference may be had for a more detailed description of the same than that hereinafter related.

It will be observed that the transmission comprises a main body casing 10 open at its upper end and which is adapted to be closed by a detachable cover 12. It will be seen that the aforementioned gear selector means 6, motor energizing means 7 and motor means 8 are in the main contained within the transmission casing and cover 12 to protect the several parts.

The transmission as will be seen upon reference to Figure 3, comprises a plurality of shifter members or rails 14, 15 and 16 which as shown are supported in a frame 17 which is detachably secured to the marginal flange 18 at the open upper end of the main body casing 16 by a plurality of bolts 19. The frame 17 provides for the support of the several shifter rails 14, 15 and 16 for rectilinear sliding movement in opposite directions, on axes parallel with each other and which axes lie in a common plane. In the arrangement shown, shift rail 14 upon suitable movement thereof axially in opposite direction affords the selection of first and reverse drive through the gear trains arranged in a conventional manner in the main body casing 10. The transmission gear trains to provide selected forward drive ratios and reverse drive are not shown in that such contructions are well-known and conventional in the art and hence are not believed necessary to show or describe. In such known constructional shift rail 15, may conveniently afford actuation of the transmission to provide 2nd and 3rd forward speed gear ratios and shifter rail 16, 4th and 5th forward gear ratios through the transmission.

For the purpose last noted the several shift rails 14, 15, and 16, as shown, have secured thereto shift forks members 22, 23, and 24 respectively, each of which have hub-portions 25, 26, and 27, respectively, which are made fast to the shift rails with the several hub-portions having suitable extensions in which slots 32, 33 and 34 respectively are formed to lie in a common plane transverse to the longitudinal axes of the shifter rails and into which slots the projecting end or shift finger 35 of shift arm means indicated generally at 36 of gear selector means 6 is adapted to be respectively aligned so that upon axial movement of shift arm means 36 the selected shift rail and shift fork is moved to provide the desired transmission operation.

The shift arm means 36 as shown in addition to the shifting finger 35 comprises a tubular sleeve 37 which in the preferred embodiment of our invention herein disclosed, also serves as a valve seat sleeve for motor means 8. The sleeve 37 extends through the bore of a hub-member 38 which is mounted for rotation upon an end cylinder wall 39 of the motor means 8. A retaining ring 40 of conventional construction is arranged internally of the enlarged annular end flange 41 of hub member 38 and the external cylindrical surface of an annular flange 42 of the cylinder end wall 39 so as to provide for relative rotary movement of the hub 38 with respect to the end cylinder wall 39. The hub 38 as shown is formed with an axially extending slot 44 into which a pin or key 45 secured to the sleeve 37 projects so that rotary movement imparted to hub 38 is applied through the slot and pin means described to the shift arm means 36 to afford the selective alignment of the shift finger 35 with the slots 32, 33, and 34 of the hubs 25, 26 and 27 of the shift fork members. It will be observed that the sleeve 37 and the hub 38 lie on a common axis parallel with the axes of the several shifter rails 14, 15, and 16 and thus provide for a compact disposal of such parts but ready accessibility in the cover of the casing for the transmission. Also, as will be seen the common axis for the shift arm means 36 and the hub 38 is coincident with that of the axis of the power cylinder and piston assembly 8.

Upon reference now to Figures 1 and 2, it will be seen that suitable lever mechanism is provided to effect rotary movement of the hub 38 and shift arm means 36 for the purpose previously indicated, and comprises a tubular shaft 50 mounted for rotation in the sidewall 52 of the transmission casing 10, on an axis transverse to and disposed below the axes of the shifter rails 14, 15 and 16. Inwardly of the wall 52 of the transmission housing a lever 53 has fixed connection with the inner end of tubular shaft 50 and the lever 53 at its outer end has pivotable connection at 54 with a vertically extending link 55 which at its upper end has pivotable connection at 56 by means of a suitable pin as shown in Figure 3 with a pair of spaced arm 57 suitably secured to the hub 38 as by welding or the like. A suitable operating handle (not shown) is adapted to have keyed connection with the outer end of tubular shaft 50 outwardly of the transmission casing 10 so that upon imparting rotary movement to the shaft 50 in clockwise or counter-clockwise direction, rotation of hub 38 in one direction or the other is effected and, which through the above described slot and pin means 44 and 45, the shift arm means 36 is rotated to align shift finger 35 selectively with one of slots 32, 33 and 34 of the hubs of the several shifter forks. Accordingly, the operator of the vehicle in which the transmission is mounted has available for his manual selection alignment of shift finger 35 selectively with the shift forks of the several shift rails so that upon subsequent axial movement of the shift forks in one direction or the other the transmission may be operated to effect a desired drive therethrough. It will be further observed upon reference to Figure 4 that the hub 38 is provided with a depending flange or plate member 60 secured thereto by welding or the like which is adapted to have engagement with a spring loaded pin indicated generally at 61. As shown, the pin 61 is mounted in a pin guide member 62, threaded in sidewall 52 of the transmission casing. A spring 63 is arranged between the pin and guide member to normally bias the pin 61 in a direction to engage the flange or plate 60. A lock nut 65 has threaded engagement with the outer end of the guide member 62 to provide for the positioning and adjustment of the biasing force of the spring 61. In the arrangement of parts shown, plate 60 and spring loaded pin 61 are so arranged that when tubular shaft 50 is disposed by the operator to affect disposition of the shift finger 35 to provide for first forward or reverse drive, that the plate 60 is positioned to compress the spring 61 and in that manner apply a biasing force to tubular shaft 50 so that the operator is aware that he is actuating the transmission for either first forward ratio or reverse drive. This condition of operation is an important one for the operator of the vehicle to be sensitive to and the aforedescribed construction provides that effect.

Referring now to the motor energizing means 7 of the embodiment of our invention herein disclosed it will be seen that it comprises a collar or actuator member 70 fixed about valve rod 72 of the motor means 8, hereinafter described in greater detail, and which collar means comprises a pair of trunnions or pins 73—73 extending transversely of the longitudinal axis of the valve rod 72. As seen in Figures 1 and 2 a lever member 77 is formed at its upper end with a yoke portion 78 having a pair of spaced arms 79—79 formed with slots 80 in which the pins 73—73 are disposed. The lever 77 at its other end is secured to shaft 81 which is parallel in and extends coaxially through the tubular shaft member 50 of gear selector means 6. As shown, the outer end of shaft 81 projects beyond the outer end of shaft 50 and a handle or other suitable actuating means is adapted to be connected thereto to effect rotation of shaft 81 in one direction or the other. The yoke member 78 is correspondingly moved about the axis of shaft 81 to provide for movement of shift collar 70 and valve rod 72 in one direction or the other along the longitudinal axis of the latter. Such movement, as will be seen later, provides for the selective energization of motor means 8 to afford a source of force in effecting a selected gear shift rail of the transmission.

The motor means 8, as previously mentioned, per se forms the subject matter of the above referred to application and which may be referred to for a fuller description if desired. It will be seen that the motor means 8 comprises a power cylinder 83 formed as part of and with the frame 17 for supporting the several shift rails and has a power piston 84 mounted for axial movement therein. In addition to the previously referred to end wall 39 there is provided an end closure member 85 having a cylindrical bore 86 in which one end portion of the sleeve 37 is journalled. In the embodiment herein disclosed sleeve 37 also constitutes a valve seat sleeve for motor means 8 and has, as already noted, sliding movement coaxially of the axis of the power cylinder. The other end portion of the sleeve 37 is also slidingly journaled in the end wall 39 and hub 38. The hub 38, previously referred to, is rotatable conjointly with sleeve 37 and, as previously mentioned, the slot and pin means 44 and 45 afford axial movement of the sleeve 37 relative to hub 38. The valve rod 72 as shown and as previously mentioned, projects coaxially through sleeve 37 is axially movable relative thereto and serves as a control member for connecting the motor means 8 with fluid under pressure.

The adjacent end of sleeve 37 journaled in the end cap member 85 of the motor means 8 and the adjacent end portion of the valve rod 72 are provided with a lost motion connection comprising a pin 90 secured at its opposite ends in the sleeve, and which pin extends through elongated slots 91 in the valve rod 72. A pair of springs 92 and 93 are disposed with one end to either side of and in engagement with the pin 90 and which springs in the embodiment of the invention shown are of equal strengths and arranged so as to dispose normally the rod 72 with respect to sleeve 37 in position in which the pin 90 is centered axially of the slots 91 in the valve rod.

The power piston 84, as shown, is secured to the sleeve 37 within the power cylinder 83, by snap rings 94 so that the power piston 84 and sleeve 37 are connected together for conjoint axial movement, so that the latter constitutes a rectilinearly force applying member for the motor means 8. The sleeve 37 as shown, is formed with fluid passageways or bores 95 and 96 which define valve seats at their inner ends and open into the power cylinder at opposite ends of the power piston 84.

The valve rod 72 has a bore 100 for a major portion of its length and fluid under pressure is adapted to be admitted into the left-hand end thereof, as viewed in Figure 3 of the drawings. Also, it will be observed, flow divider means 97, arranged in counter-bore 101 inwardly of the lost motion connecting means 90—91, is provided with a bore 102 in communication with the bore 100 of the valve rod. The valve rod further comprises fluid ports 103 and 104 opening into annular grooves 105 and 106 which are adapted to be aligned with the ports 95 and 96 of the sleeve 37. The flow divider 97 is further provided with an axially extending groove 107 which connects with port 108 in communication with an annular vent groove 109 lying intermediate the annular grooves 105 and 106. In the position of the parts shown in Figure 3 of the drawings, fluid under pressure is adapted to be admitted through the bore 100 of the valve rod 72 through annular recesses 105 and 106 to the power cylinder 83 at opposite ends of the power piston 84 so that the latter is retained in the position shown. Upon movement of the valve rod 72 to the left from the position shown, annular recess 105 will be disconnected from port 95 and fluid under pressure will flow through groove 102 of the flow divider 97 through annular recess 106 and port 96 to power cylinder 83 at the right-hand end of power piston 84 to effect shifting of the power piston 84 to the left, as viewed in the drawing. Movement of the valve rod 72 to the right effects placing in communication annular recess 105 with part 95 so as to move the power piston 84 to the right and disconnect annular groove 106 from part 96. In movement of the valve rod to the left or the right, it will be observed that the annular vent groove 109 will be effective to connect the power cylinder at its end opposite to the end at which fluid under pressure is being admitted through groove 107 to vent so that as fluid under pressure is admitted to the power cylinder opposite one end of the power piston the portion of the cylinder opposite the other end of the power piston is vented to provide the aforementioned movement of the power piston 84 in the power cylinder 83.

In the movement of valve rod 72 to the left or right as above described and relative to sleeve 37 as permitted by lost motion connecting means 90, 91 it will be seen that the balance springs 92 or 93, respectively will be placed under compression. Thus as the power piston 84 and sleeve 37 are conjointly moved in one direction or the other the operator of the shifter mechanism must maintain shifting force on the valve rod 72 whereby he is provided with a sense of feel of making the shift. If shifting force is discontinued on valve rod 72, the balance springs 92 and 93 will dispose the valve rod 72 and sleeve 37 relative to each other to the position shown in Figure 3 so that fluid under pressure is admitted equally to the power cylinder 83 at opposite ends of the power piston 84 and discontinue movement of the power piston 84. Thus the operator is required to manually complete a shifting operation and when that operation is completed the valve rod 72 and sleeve 37 are conditioned, with balanced pressures opposite both ends of the power piston 84, for the next shifting operation.

It will thus be observed in the shifting mechanism of our invention that the operator, by appropriate manipulation of the gear selector means 6 may effect rotation of tubular shaft 50 and through the lever means 53, 55 dispose shift arm means 36 in the desired position with respect to the shifter forks 25, 26, and 27 of the several shifter rails. Having made that selection and upon appropriate actuation of motor energizing means 7 by rotating shaft 81, valve rod 72 may be moved to the left or right through member 77 and collar 70 to energize the power cylinder and effect axial movement of the power piston 84 to the left or right as desired which as above described applies shifting force through shift arm means 36 to the shifter forks. Thus in the arrangement described, the operator may manually readily select by means of gear selector means 6 a desired gear shift rail and fork to provide for the actuation of the transmission as previously described, and by appropriate manipulation of the motor energizing means 7 afford a power shift to the selected gear rail and in a selected direction.

While we have shown and described what we consider to be a preferred embodiment of our invention, it will be understood that various modifications and rearrangements may be made therein without departing from the spirit and scope of our invention.

We claim:

1. Shifter mechanism for association with a multi-shift transmission and motor means including a rectilinearly movable force applying member and control means for said motor means including a control member movable coaxially of and relative to said force applying member for selectively connecting said motor means with a source of fluid under pressure to effect rectilinear movement of said force applying member, comprising gear selector means associated with said transmission for selecting desired shifting operations thereof and including a shift arm mounted for rotation about the axis of said force applying member and axially movable therewith, and motor energizing means including an actuator member connected to said control member for effecting rectilinear movement of the latter.

2. Shifter mechanism for association with a multi-shift transmission and motor means including a power piston mounted for movement in a power cylinder, and valve control means for said motor means including a valve rod movable coaxially of and relative to said power piston for selectively connecting said power cylinder with a source of fluid under pressure to effect movement of said power piston in said power cylinder, comprising gear selector means associated with said transmission for selecting desired shifting operations thereof and including a shift arm mounted for rotation about the axis of said power piston and axially movable therewith, and motor energizing means including an actuator member connected to said valve rod for effecting movement of the latter along its axis.

3. Shifter mechanism for association with a multi-shift transmission having a plurality of shifter rails and motor means including a power piston mounted for movement in a power cylinder, and control means for said motor means for selectively connecting said power cylinder with a source of fluid under pressure to effect movement of said power piston in said power cylinder, comprising gear selector means including shift arm means having a sleeve connected to said power piston for movement axially therewith and rotatable about the axis of the same, hub means mounted on said sleeve coaxially thereof, slot and key means between said sleeve and said hub means providing for axial movement of said shift arm means relative to said hub means and for conjoint rotation of said hub means and said shift arm means, and manually operable lever means having connection with said hub means for imparting rotary movement to said hub means to dispose said shift arm means in desired positions with respect to the shifter rails of said transmission.

4. Shifter mechanism for association with a multi-shift transmission having a plurality of shifter rails and motor means including a power piston mounted for movement in a power cylinder, and valve control means for said motor means including a valve rod movable coaxially of and relative to said power piston for selectively connecting said power cylinder with a source of fluid under pressure to effect movement of said power piston in said power cylinder, comprising gear selector means including shift arm means having a sleeve connected to said power piston for movement axially therewith and rotatable about the axis of the same, hub means mounted on said sleeve coaxially thereof, slot and key means between said sleeve and said hub means providing for axial movement of said shift arm means relative to said hub means and for conjoint rotation of said hub means and said shift arm means, manually operable lever means having connection with said hub means for imparting rotary movement to said hub means to dispose said shift arm means in desired positions with respect to the shifter rails of said transmission, and motor energizing means including collar means connected to said valve rod, and lever means connected with said collar means for axially moving the same and said valve rod and thereby admit fluid under pressure to said power cylinder to effect movement of said power piston and said shift arm means for shifting the shifter rails of said transmission.

5. Shifter mechanism for association with a multi-shift transmission having a plurality of shifter rails and motor means including a power piston mounted for movement in a power cylinder, and valve control means for said motor means including a valve rod movable coaxially of and relative to said power piston for selectively connecting said power cylinder with a source of fluid under pressure to effect movement of said power piston in said power cylinder, comprising gear selector means including shift arm means having a sleeve connected to said power piston for movement axially therewith and rotatable about the axis of the same, hub means mounted on said sleeve coaxially thereof, slot and key means between said sleeve and said hub means providing for axial movement of said shift arm means relative to said hub means and for conjoint rotation of said hub means and said shift arm means, manually operable first lever means having connection with said hub means for imparting rotary movement to said hub means to dispose said shift arm means in desired positions with respect to the shifter rails of said transmission, motor energizing means including collar means connected to said valve rod, second lever means connected with said collar means for axially moving the same and said valve rod and thereby admit fluid under pressure to said power cylinder to effect movement of said power piston and said shift arm means for shifting the shifter rails of said transmission, and said first and second lever means having shaft portions one journalled within the other and arranged coaxially on an axis transverse to the axis of said power piston and valve rod.

6. Shifter mechanism for association with a multi-shift transmission having a plurality of shifter rails and motor means including a power piston mounted for movement in a power cylinder, and valve control means for said motor means for selectively connecting said power cylinder with a source of fluid under pressure to effect movement of said power piston in said power cylinder, comprising gear selector means including shift arm means having a sleeve for mounting the same for rotation about the axis of said power piston for selective alignment of said shift arm means with the shifter rails of said transmission and axially movable with said power piston, hub means mounted on said sleeve for conjoint rotary movement therewith and axial movement relative thereto, manually operable lever means having connection with said hub means for imparting rotary movement thereto to dispose said shift arm means in selected positions with respect to the shifter rails of said transmission, and spring means for resisting rotary movement of said hub means in disposing said shift arm means to a predetermined position with respect to one of said shifter rails of said transmission.

7. Shifter mechanim for association with a multi-shift transmission having a plurality of parallel shifter rails arranged with their axes lying substantially in a common plane, and a source of fluid under pressure comprising motor means including a power piston mounted for movement in a power cylinder on an axis parallel with the axes of said shifter rails, and valve control means including a valve rod movable coaxially of and relative to said power piston for selectively connecting said power piston with said source of fluid under pressure to effect movement of said power piston in said power cylinder, gear selector means including shift arm means having a sleeve for mounting the same for rotation about the axis of said power piston for selective engagement of said shift arm means with the shifter rails of said transmission and axially movable with said power piston, hub means mounted on said sleeve for conjoint rotary movement therewith and axial movement relative thereto, and manually operable lever means having connection with said hub means for imparting rotary movement thereto to dispose said shift arm means in selected positions with respect to the shifter rails of said transmission.

8. Shifter mechanism for association with a multi-shift transmission having a plurality of parallel shifter rails arranged with their axes lying substantially in a common plane, and a source of fluid under pressure comprising motor means including a power piston mounted for movement in a power cylinder on an axis parallel with the axes of said shifter rails, and valve control means including a valve rod movable coaxially of and relative to said power piston for selectively connecting said power piston with said source of fluid under pressure to effect movement of said power piston in said power cylinder, gear selector means including shift arm means having a sleeve for mounting the same for rotation about the axis of said power piston for selective engagement of said shift arm means with the shifter rails of said transmission and axially movable with said power piston, hub means mounted on said sleeve for conjoint rotary movement therewith and axial movement relative thereto, and manually operable lever means having connection with said hub means for imparting rotary movement thereto to dispose said shift arm means in selected positions with respect to the shifter rails of said transmission, motor energizing means including collar means connected to said valve rod, and manually operable lever means connected with said collar means for axially moving the same and said valve rod and thereby admit fluid under pressure from said source of fluid under pressure to said power cylinder to effect movement of said power piston and said shift arm means to shift the shifter rails of said transmission.

9. Shifter mechanism for association with a multi-shift transmission having a plurality of parallel shifter rails arranged with their axes lying substantially in a common plane, and a source of fluid under pressure comprising motor means including a power piston mounted for movement in a power cylinder on an axis parallel with the axes of said shifter rails, and valve control means including a valve rod movable coaxially of and relative to said power piston for selectively connecting said power piston with said source of fluid under pressure to effect movement of said power piston in said power cylinder, gear selector means including shift arm means having a sleeve for mounting the same for rotation about the axis of said power piston for selective engagement of said shift arm means with the shifter rails of said transmission and axially movable with said power piston, hub means mounted on said sleeve for conjoint rotary movement therewith axial movement relative thereto, and manually operable first lever means having connection with said hub means for imparting rotary movement thereto to dispose said shift arm means in selected positions with respect to the shifter rails of said transmission, motor energizing means including collar means connected to said valve rod, manually operable second lever means connected with said collar means for axially moving the same and said valve rod and thereby admit fluid under pressure from said source of fluid under pressure to said power cylinder to effect movement of said power piston and said shift arm means to shift the shifter rails of said transmission, and said first and second lever means having shaft portions one journalled within the other and arranged coaxially as an axis transverse to the axis of said power piston and valve rod.

References Cited in the file of this patent

UNITED STATES PATENTS

| | | |
|---|---|---|
| 2,152,914 | Price et al. | Apr. 4, 1939 |
| 2,527,727 | Hobbs | Oct. 31, 1950 |